United States Patent [19]
Fukuyama et al.

[11] Patent Number: 5,088,762
[45] Date of Patent: Feb. 18, 1992

[54] CONTROL SYSTEM FOR ACTIVE SUSPENSION WHICH DISTRIBUTES LOAD ACCORDING TO LATERAL ACCELERATION

[75] Inventors: Kensuke Fukuyama; Naoto Fukushima; Yohsuke Akatsu; Itaru Fujimura; Masaharu Sato, all of Kanagawa, Japan

[73] Assignee: Nissan Motor Company, Limited, Japan

[21] Appl. No.: 589,914

[22] Filed: Sep. 28, 1990

[30] Foreign Application Priority Data

Sep. 29, 1989 [JP] Japan .................. 1-253984

[51] Int. Cl.⁵ .............................. B60G 17/00
[52] U.S. Cl. ....................... 280/707; 280/772
[58] Field of Search ............. 280/707, 689, 772; 364/424.05

[56] References Cited

U.S. PATENT DOCUMENTS

| | | | |
|---|---|---|---|
| 4,761,022 | 8/1988 | Ohashi | 280/772 |
| 4,801,155 | 1/1989 | Fukushima | 280/707 |
| 4,903,983 | 2/1990 | Fukushima | 280/707 |
| 4,934,731 | 6/1990 | Hiwatashi | 280/707 |
| 4,943,084 | 7/1990 | Fukunaga | 280/707 |

*Primary Examiner*—Charles A. Marmor
*Assistant Examiner*—Karin Tyson
*Attorney, Agent, or Firm*—Lowe, Price, LeBlanc & Becker

[57] ABSTRACT

An active suspension system for an automotive vehicle is provided which regulates relative displacement between a vehicle body and wheels. This suspension system includes first and second gain controllers associated with hydraulic cylinders for supressing vehicular rolling based on lateral acceleration acting on the vehicle body. The first and second gain controllers amplify the level of the lateral acceleration, monitored by a sensor, by first and second gains respectively to vary pressure of the hydraulic cylinders. The suspension system further includes a low-pass filter which restricts a frequency of a signal output from the acceleration sensor high than a preselected cutoff frequency to decrease the second gain relative to the first gain to reduce the degree of load shift for the rear wheels relative to that of the front wheels.

14 Claims, 12 Drawing Sheets

CONTROL SYSTEM FOR ACTIVE SUSPENSION WHICH DISTRIBUTES LOAD ACCORDING TO LATERAL ACCELERATION

BACKGROUND OF THE INVENTION

1. Technical Field

The present invention relates generally to an active suspension system for an automotive vehicle. More particularly, the invention relates to an improved active suspension system which is operable to adjust load distribution ratios of left to right wheels and of front to rear wheels according to lateral acceleration acting on a vehicle body.

2. Background Art

Japanese Patent First Publication (Tokkai) No. 62-295714 which corresponds to U.S. patent continuation Application Ser. No. 455,792, filed on Dec. 20, 1989, entitled "ACTIVELY CONTROLLED AUTOMOTIVE SUSPENSION SYSTEM WITH ADJUSTABLE ROLLING-STABILITY AND/OR PITCHING-STABILITY" discloses an active suspension system. This system includes generally hydraulic cylinders interposed between a vehicle body and wheels, pressure control valves for the hydraulic cylinders, an acceleration sensor or an acceleration estimating means, and a control unit which controls the pressure control valves to adjust hydraulic pressures output therefrom. The acceleration sensor is adapted for monitoring longitudinal or lateral acceleration exerted on the vehicle body. The acceleration estimating means is operable to determine acceleration based on a vehicle speed and an actual steered angle. The control unit mathematically calculates pressure command values for controlling the pressure control valves respectively. This calculation is accomplished by multiplying the acceleration value derived from the acceleration sensor or the acceleration estimating means by preselected gains. With this arrangement, the system utilizes a response function which is equivalent to that representing actual rolling or pitching motion of the vehicle body to control such rolling and pitching.

The above prior art active suspension system distributes loads between left and right wheels in response to generation of lateral acceleration acting on the vehicle body during turns with a constant load distribution ratio of the front to rear wheels irrespective of stationary and transient statuses of a yaw rate and the lateral acceleration. For example, improved convergence of the yaw rate when the vehicle changes lanes at high speed requires the load distribution to the front wheels to be increased so that an understeering characteristic is enhanced. However, in steady circle turning, this convergence does not provide good handling and a lower degree of convergence is desirable. This therefore requires a suspension system which may suitable select between a high convergence of yaw rate during lane changing at high speed and a lower convergence of yaw rate for improvement of cornering stability in steady circle turning.

SUMMARY OF THE INVENTION

It is accordingly one object of the present invention to avoid the disadvantages of the prior art.

It is another object of the invention to provide an active suspension system which improves both convergence of a yaw rate during turns and improvement of cornering stability in steady circle turning.

According to one aspect of the present invention, there is provided an active suspension system for an automotive vehicle which comprises suspension assemblies disposed between a vehicle body and suspension members which respectively support wheels rotatably, each of the suspension assemblies including fluid pressure means of adjustable pressure, a hydraulic pressure circuit communicated with the fluid pressure means to supply pressurized fluid thereto, an acceleration sensor monitoring a lateral acceleration acting on the vehicle body to provide a signal indicative thereof, and a pressure control means for controlling the pressure of pressurized fluid to the fluid pressure means to vary load distribution between left and right front wheels and between left and right rear wheels by predetermined ratios based on the signal from said acceleration sensor, the control means including load distribution adjusting means responsive, in a transient state, to the signal indicative of lateral acceleration, to vary the ratios of load distribution such that the degree of load shift for the rear wheels is less than that of the front wheels.

According to another aspect of the invention, there is provided an active suspension system for an automotive vehicle which comprises a suspension system disposed between a vehicle body and wheels for regulating relative displacement between the vehicle body and the wheels, the suspension system including hydraulic pressure assemblies associated with front and rear wheels respectively, a hydraulic pressure circuit having a pressure source to supply pressurized fluid to the hydraulic pressure assemblies respectively, a lateral acceleration sensor monitoring a lateral acceleration acting on the vehicle body to provide a signal indicative thereof, a pressure control means for controlling the pressure of the pressurized fluid to the hydraulic pressure assemblies independently to shift load distribution between left and right front wheels and between left and right rear wheels by predetermined ratios based on the signal from the acceleration sensor, and a load distribution adjusting means responsive to the signal from the lateral acceleration sensor in a transient state thereof so as to reduce the degree of load shift for the rear wheels relative to that of the front wheels.

According to a futher aspect of the present invention, there is provided an active suspension system for an automotive vehicle comprising a first suspension system disposed between a vehicle body and front wheels including fluid pressure assemblies each regulating relative displacement between the vehicle body and the front wheel, a second suspension system disposed between the vehicle body and rear wheels including fluid pressure assemblies each regulating relative displacement between the vehicle body and the front wheel, a hydraulic pressure circuit having a pressure source to supply pressurized fluid to the fluid pressure assemblies respectively, a lateral acceleration sensor monitoring a lateral acceleration acting on the vehicle body to provide a signal indicative thereof, a pressure control means including first and second control systems associated with the first and second suspension systems respectively, the first control system controlling the pressure of the pressurized fluid of the fluid assemblies of the first suspension system to shift load distribution between the front wheels by a first ratio based on the signal from the lateral acceleration sensor, the second control system controlling the pressure of the pressurized fluid of the fluid assemblies of the second suspension system to shift load distribution between the rear wheels by a second ratio based on the signal from the lateral acceleration sensor, and a load distribution adjusting for decreasing the second ratio relative to the first ratio to reduce the degree of load shift for the rear wheels relative to that of the front wheels in a transient state of lateral acceleration monitored by the lateral acceleration sensor.

According to a still further aspect of the invention, there is provided an active suspension system for an automotive vehicle which comprises suspension assemblies disposed between a vehicle body and suspension members which respectively support wheels rotatably, each of the suspension assemblies including fluid pressure means of adjustable pressure, a hydraulic pressure circuit communicated with the fluid pressure means to supply pressurized fluid thereto, an acceleration sensor monitoring a lateral acceleration acting on the vehicle body to provide a signal indicative thereof, and a pressure control means responsive to the signal indicative of the lateral acceleration moitored by the acceleration sensor to generate anti-rolling control signal for adjusting fluid pressure in respective of the fluid pressure means, the pressure control means detective of transient state of vehicular rolling to adjust load characteristics which is derived in relation to the signal indicative of the lateral acceleration.

DESCRIPTION OF THE PREFERRED EMBODIMENT

Figure 1:
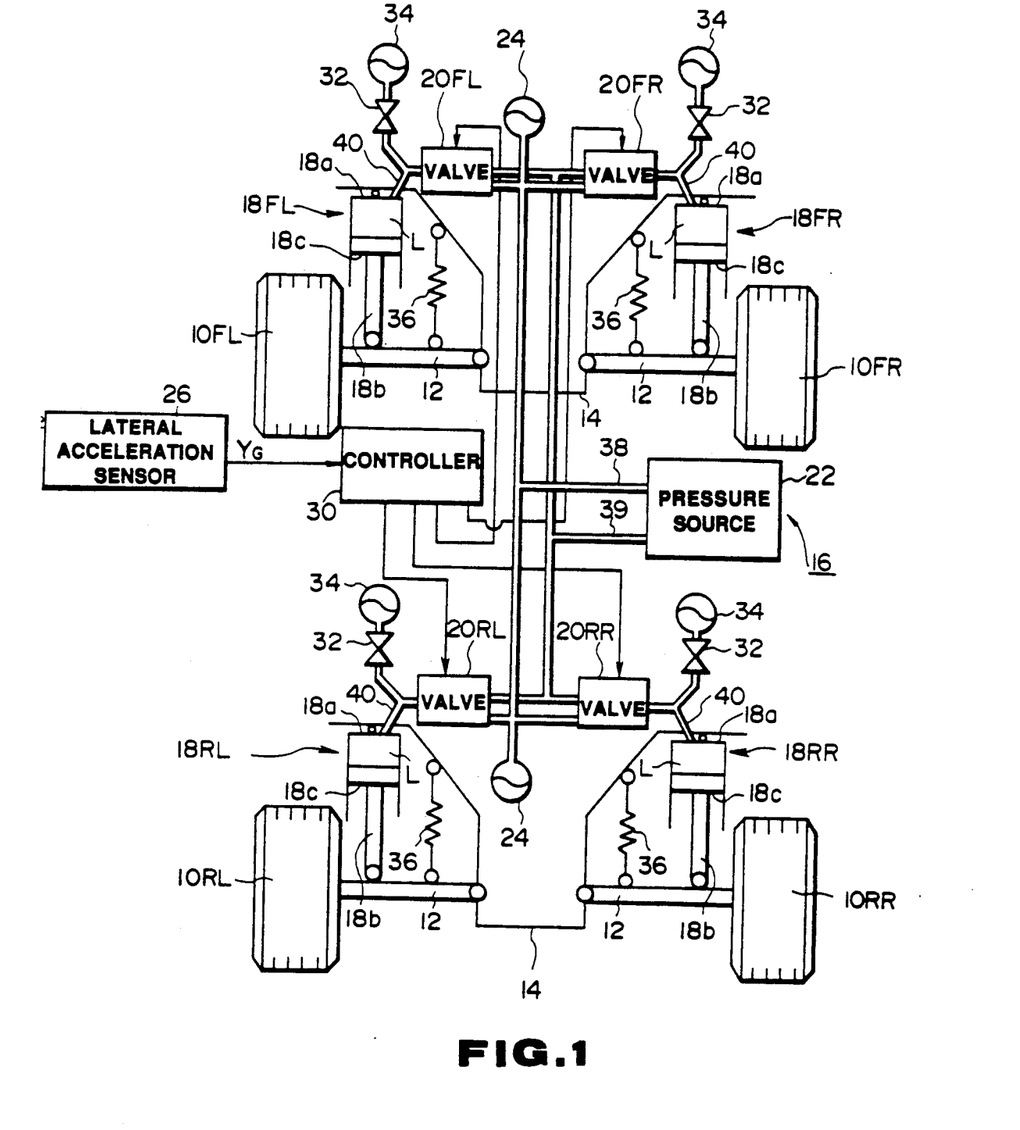
FIG. 1 is a schematic view which shows an active suspension system according to the present invention.

Referring now to the drawings wherein like numbers refer to like parts in several views, particularly to FIG. 1, an active suspension system according to the present invention is shown which is operable to effect suspension control for regulating vehicular height level and vehicular attitude by suppressing relative displacement between a vehicle body 14 and suspension members 12 which rotatably support front-left, front-right, rear-left, and rear-right wheels 10FL, 10FR, 10RL, and 10RR. The active suspension system 16 includes generally hydraulic cylinders 18FL, 18FR, 18RL, and 18RR, which are interposed between the vehicle body 14 and the suspension members 12 respectively, pressure control valves 20FL to 20RR, operable to adjust working pressures of the hydraulic cylinders, a pressure source 22 for the hydraulic cylinders, front and rear accumulators 24 provided between the pressure source 22 and the pressure control valves 20FL to 20RR for accumulating excess pressure generated in the pressure source, a lateral acceleration sensor 26 which monitors lateral acceleration acting on the vehicle body, and a control unit 30 which controls pressure output from the pressure control valves 20FL to 20RR independently. The active suspension system 16 further includes coil springs 36 disposed between the suspension members 12 and the vehicle body 14 in a parallel relation to each other each associated with the hydraulic cylinders 18FL to 18RR, throttle valves 32 each communicating with working chambers L (which will be referred hereinafter in detail) of the hydraulic cylinders 18FL to 18RR, and pressure accumulators 34 for damping vibration transmitted from a road through the wheels. Each coil spring 36 has a relatively low spring constant and is operable to support a static load of the vehicle body.

The hydraulic cylinders 18FL to 18RR include a cylinder tube 18a in which a piston 18c is slidably disposed to define the upper working chamber L. An upper end of the cylinder tube 18a is attached to the vehicle body 14 while an lower end of the piston rod 18b is fixed on the suspension member 12.

The pressure control valves 20FL to 20RR include a valve housing having a cylindrical hole in which a spool is slidably disposed and a proportional solenoid installed in the valve housing. This pressure control valve is designed as a pilot-operated directional control valve. Supply and return ports for working fluid of the pressure control valves 20FL to 20RR are fluidly connected to the pressure source through pressure lines 38 and 39. An output port of the pressure control valve communicates with the working chamber L of the hydraulic cylinder through a hydraulic line 40. U.S. Pat. application Ser. No. 052,934, filed on May 22, 1987 now U.S. Pat. No. 4,903,983 discloses an active suspension system which includes pressure control valves which are applicable to the present suspension control system disclosure of which is incorporated herein by reference.

It will be noted that by controlling an exciting current I applied to the proportional solenoid so as to balance thrust of the spool and a pilot pressure generated by pressure of the output port, an output pressure P according to the exciting current I is supplied from the output port to the working chamber L of the hydraulic cylinder.

Figure 2:
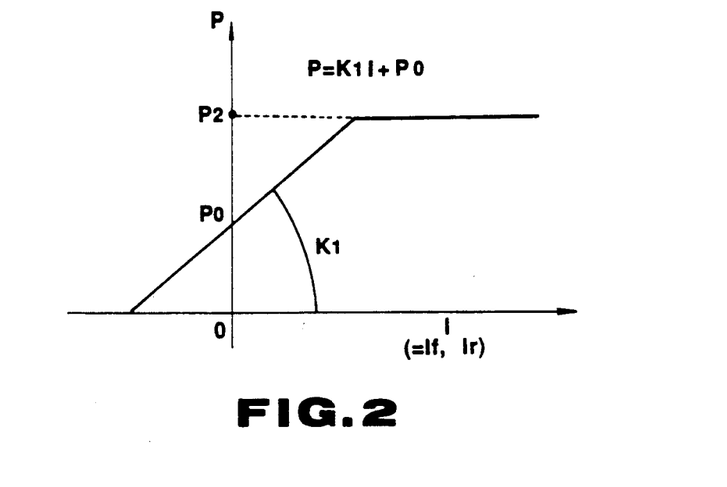
FIG. 2 is a graph which shows a relation between an output pressure of a pressure control valve and an exciting current therefor.

Referring to FIG. 2 a relation between the output pressure of the pressure control valve and the exciting current for the proportional solenoid is shown. The pressure control valve is adapted for outputting a preselected offset pressure $P_0$ when the exciting current I is zero. As the positive exciting current I is increased from this level, the output pressure becomes great with a preselected gain $K_1$ and is then saturated when the pressure source 22 reaches a pressure $P_2$. On the other hand, decrease in the negative exciting current causes the output pressure P to be decreased from the offset pressure $P_0$ proportionally.

Figure 3:
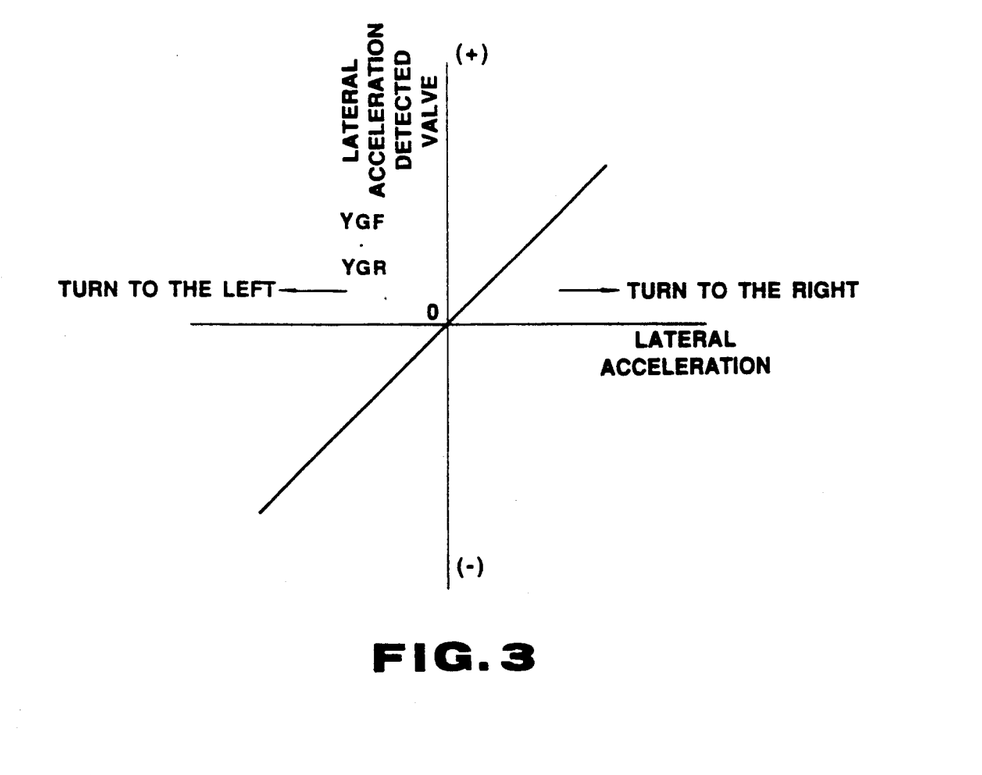
FIG. 3 is a graph which shows a relation between a voltage level output from an acceleration sensor and a lateral acceleration acting on a vehicle body.

The lateral acceleration sensor 26, as shown in FIG. 3, is adapted for outputting a lateral acceleration signal $Y_G$ having a voltage indicative of a monitored acceleration value which is proportional to a lateral acceleration acting on a preselected position of the vehicle body. The positive voltage is output when a vehicle is turned in a right direction from a straight running status while the negative voltage is output when turned in a left direction.

Figure 4:
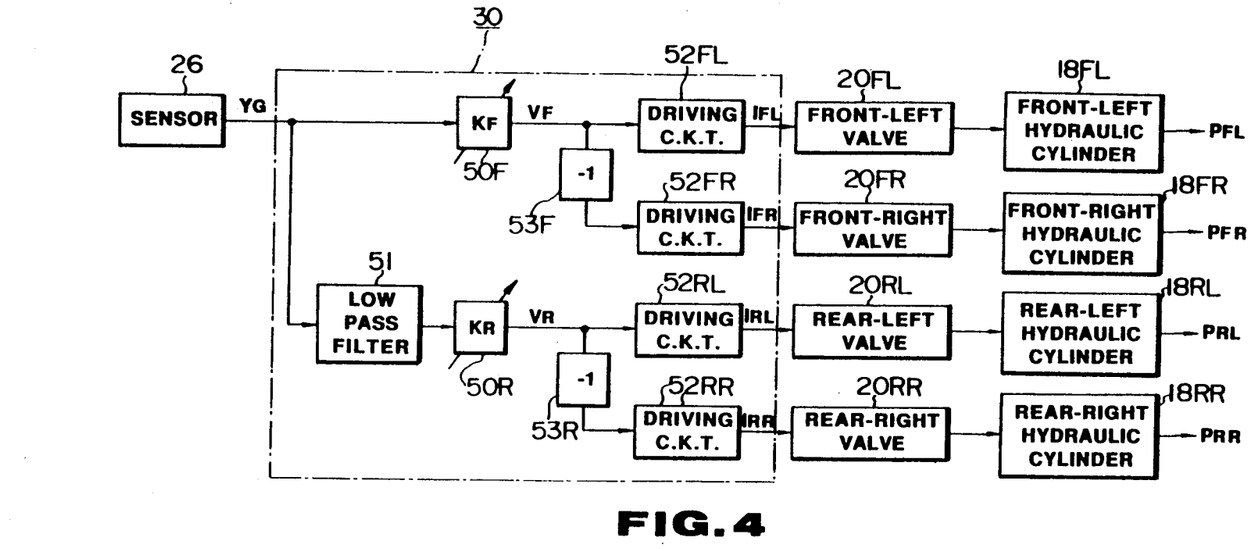
FIG. 4 is a block diagram which shows a control unit of an active suspension system according to the invention.

Referring to FIG. 4, the control unit 30 comprises generally a front-wheel control system which includes a front-wheel gain controller 50F, an inverter 53F, and driving circuits 52FL and 52FR and a rear-wheel control system which includes a low-pass filter 51, a rear-wheel gain controller 50R, an inverter 53R, and driving circuits 52RL, and 52RR. The front-wheel gain controller 50F responsive to the lateral acceleration signal $Y_G$ output from the lateral acceleration sensor 26 to multiply its value by a preselected gain $K_F$ and provides an output voltage $V_F$. The rear-wheel gain controller 50R responsive to the lateral acceleration signal $Y_G$ passing through the low pass filter 51 to multiply its value by a preselected gain $K_R$ and provides an output voltage $V_R$. The driving circuit 52FL may be provided with a floating type constant-current circuit which converts the output voltage $V_F$ into an exciting current $I_{FL}$ for the pressure control valve 20FL. The driving circuit 52FR is the same type as that of the driving circuit 52FL and receives the output voltage $V_F$ of the front-wheel gain controller 50F through the inverter 53F to convert it into an exciting current $I_{FR}$ for the pressure control valve 20FR. The driving circuit 52RL is also the same type as those of the driving circuits 52FL and 52FR and receives the output voltage $V_R$ from the rear-wheel gain controller 50R to convert it into an exciting current $I_{RL}$ for the pressure control valve 20RL. The driving circuit 52RR is also the same type as those of the driving circuits 52FL to 52RL and receives the output voltage $V_R$ through the inverter 53R to convert it into a current $I_{RR}$ for the pressure control valve 20RR.

These exciting currents $I_{FL}$ to $I_{RR}$ energize the proportional solenoids of the pressure control valves 20FL to 20RR to control hydraulic pressures output from the valves respectively.

Figure 5:
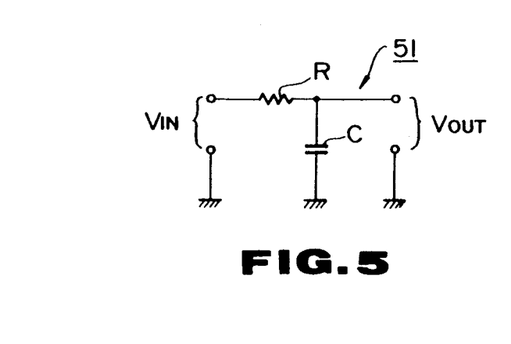
FIG. 5 is a circuit diagram which shows an example of a low-pass filter applicable to the system shown in FIG. 4.
Figure 6A:
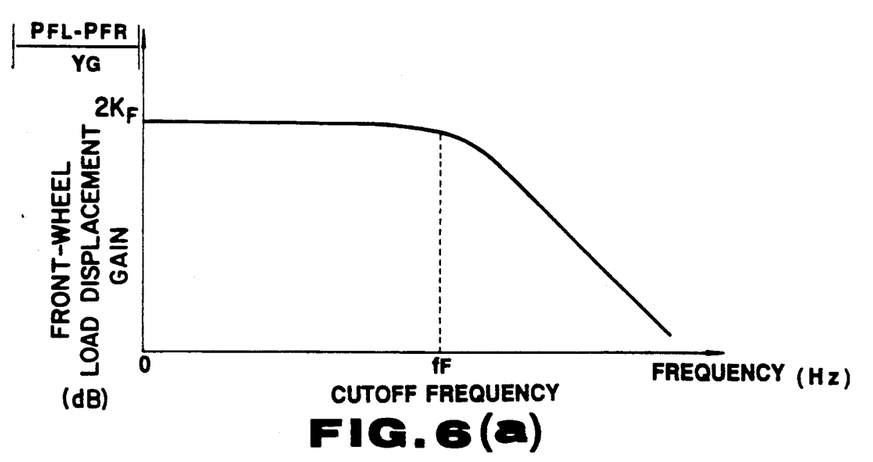
FIGS. 6(a) and 6(b) are graphs which respectively show relations between frequencies and load displacement gains in front-wheel and rear-wheel control systems.
Figure 6B:
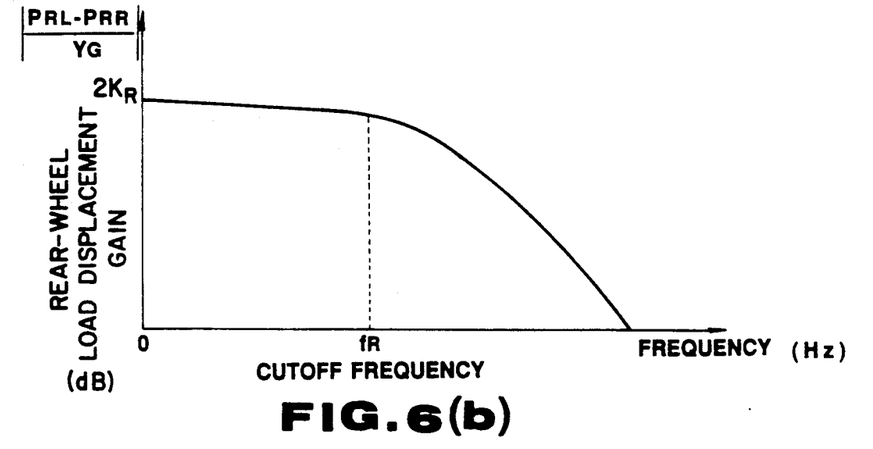

Referring to FIG. 5, an example of the low-pass filter 51 is shown. The low-pass filter 51 is provided with an analog filter which includes a resistance R and a capacitance C to provide a time constant T (=RC) so that a cutoff frequency $f_R$, a frequency characteristic of the rear-wheel control system, is, as shown in FIG. 6(b), lower than a cutoff frequency $f_F$, a frequency characteristic of the front-wheel control system as shown in FIG. 6(a).

Assuming that thrusts generated by the hydraulic cylinders 18FL to 18RR are denoted by $P_{FL}$ to $P_{RR}$ respectively, the absolute value of a load displacement between the front left and right wheels is given by $|P_{FL}-P_{FR}|$, while the absolute value of a load displacement between the rear left and right wheels is designated by $|P_{RL}-P_{RR}|$. It will be noted that a front-wheel load displacement gain $K_F$ and a rear-wheel load displacement gain $K_R$ dependent upon frequencies shown in FIGS. 6(a) and 6(b) are represented by dividing the above absolute values of the load displacements by the absolute value $|Y_G|$ of a lateral acceleration $Y_G$ detected by the lateral acceleration sensor 26.

In operation, assuming that a vehicle is now running straight on an even road having no protrusions, there is no lateral acceleration acting on a vehicle body in this status and thus the lateral acceleration sensor 26 outputs a lateral acceleration signal $Y_G$ representing zero value. The driving circuits 52FL and 52RR provide the exciting currents $I_{FL}$ to $I_{RR}$ of zero value to the pressure control valves 20FL to 20RR with the result that the excitation coils of the proportional solenoids are not energized. Therefore, the pressure control valves 20FL to 20RR, as mentioned previously, provide the preselected offset pressures $P_o$ to the working chambers L of the hydraulic cylinders 18FL to 18RR respectively to maintain the vehicle body at a level orientation at a regulated vehicular height. Additionally, in this situation, a relatively low frequency, caused by vibrations transmitted from the load through the wheels 10FL to 10RR, which corresponds to a spring resonance frequency, is absorbed by displacement of the spools of the pressure control valves 20FL to 20RR.

When the vehicle is turned to the right from the straight running status, the vehicle body is rolled in a counterclockwise direction as viewed form the rear side. The lateral acceleration sensor 26 responds to the rolling motion to provide a lateral acceleration signal $Y_G$ having a negative value to the control unit 30. The control unit 30 then calculates the output voltages $V_F$ and $V_R$ for the driving circuits respectively by multiplying the value of the lateral acceleration signal $Y_G$ by the front-wheel and rear-wheel gains $K_F$ and $K_R$. These output voltages are applied directly to the driving circuits 52FL and 52RL which in turn converted into the exciting currents $I_{FL}$ and $I_{RL}$ to be applied to the proportional solenoids of the left pressure control valves 20FL and 20RL. The output voltages $-V_F$ and $-V_R$ for the right pressure control valves 20FR and 20RR inverted by the inverters 53F and 53R are converted by the driving circuits 52FR and 52RR into excitation currents $-I_{FR}$ and $-I_{RR}$. Therefore, the pressures P output from the left pressure control valves 20FL and 20RL are increased more than the offset pressure $P_o$, causing the pressures of the working chambers L of the left hydraulic cylinders 18FL and 18RL to be increased to generate thrust against the vehicular rolling motion. On the other hand, the pressures P output from the right pressure control valves 20FR and 20RR are lowered less than the offset pressure $P_o$, causing pressures of the right hydraulic cylinders 18FR and 18RR to be reduced to provide thrusts which do not promote the rolling motion. It will be appreciated that an anti-roll effect is provided.

Figure 7:
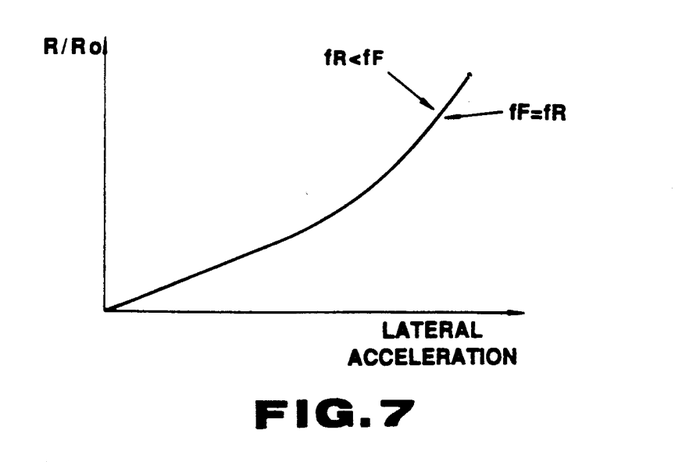
FIG. 7 is a graph which shows a relation between lateral acceleration and a stability factor.

During steady turning or in a status near steady turning, an acceleration signal $Y_G$ of a frequency lower than the cutoff frequencies $f_F$ and $f_R$ is output from the lateral acceleration sensor 26. It will be appreciated that the load displacement control gains of the front-wheel and rear-wheel control systems are, as shown in FIGS. 6(a) and 6(b), substantially equal to stationary gains $2K_F$ and $2K_R$ and thus a load distribution ratio between the front to that between the rear wheels is set to a $K_F$ to $K_R$ ratio. Even if the cutoff frequencies of the front-wheel control system and/or the rear-wheel control systems are varied within a range above the lateral acceleration signal frequency, the gains $2K_F$ and $2K_R$ provided by the gain controller 50F and 50R are not changed, resulting in a constant load distribution ratio of the front wheels to the rear wheels for steady circle turning. It will be noted that provision of a difference in the cutoff frequencies $f_F$ and $f_R$ between the front-wheel and rear-wheel control systems does not affect a vehicular steering characteristic in the steady circle turning at all. Therefore, when the vehicle is running in steady circle turning with the front-wheel and rear wheel control systems having cutoff frequencies different from each other, a stability factor is, as shown in FIG. 7, constant.

Figures 8A, 8B:
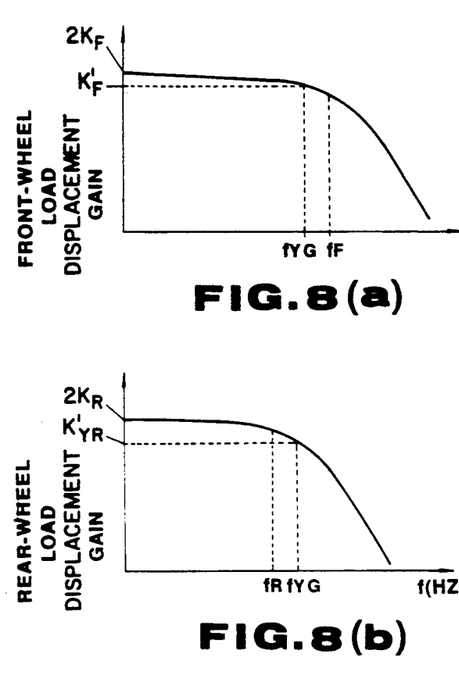
FIGS. 8(a) and 8(b) are graphs which respectively show relations between frequencies and load displacement gains in a transient state in the front-wheel and rear-wheel control systems.

On the other hand, in transient turning, for example when the vehicle approaches an end of a turn, the lateral acceleration sensor 26 provides a signal having a frequency $f_{YG}$ varying within a range defined intermediate the cutoff frequencies $f_F$ and $f_R$ of the front-wheel and rear-wheel control systems. The load displacement control gains of the front-wheel and rear-wheel control systems are, as shown in FIGS. 8(a) and 8(b), set to values $K'_F$ and $K'_R$ lower than the load displacements gains $2K_F$ and $2K_R$ of the front-wheel and rear-wheel control systems. Especially, the load displacement gain $K'_R$ of the rear-wheel control system is reduced relative to the load displacement gain $2K_R$ in the steady circle turning.

A ratio of load displacement between the rear wheels in transient turning is given by a relation of $|K'_R/(K'_F+K'_R)|$ which is less than a ratio of load distribution between the rear wheels $|K_R/(K_F+K_R)|$ in the steady circle turning, the vehicular steering characteristic being thereby subject to understeering.

Figures 9A, 9B:
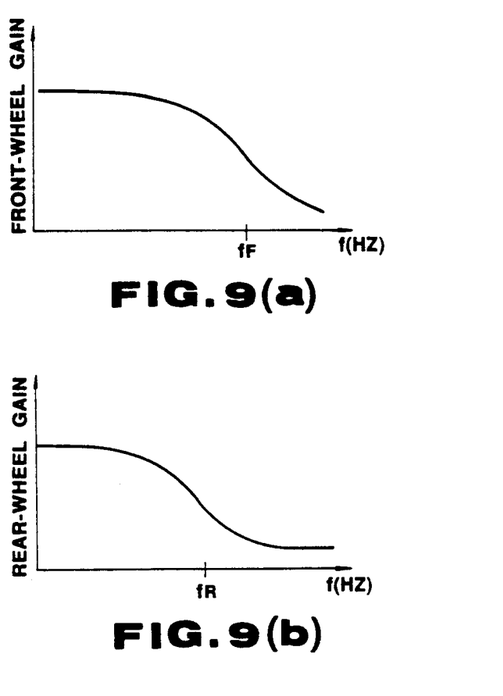
FIGS. 9(a) and 9(b) are graphs which respectively show relations between frequencies and phases in a transient status in the front-wheel and rear-wheel control systems.
Figures 10A, 10B:
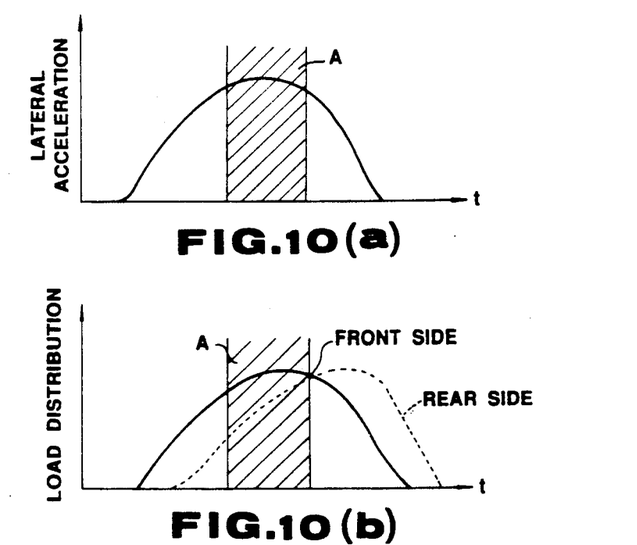
FIG. 10(a) is a graph which shows a relation between a lateral acceleration value and time.
FIG. 10(b) is a graph which shows a relation between load displacement and time when a phase is delayed to reduce load distribution to the front wheels.

Additionally, at this time, a phase of the gain i.e., the load shift between the rear wheels is, as shown in FIG. 9(b), delayed more than a phase of the load distribution to the front wheels as shown in FIG. 9(a). It will be appreciated that the low-pass filter 51 also functions as a phase lag means as will be described hereinafter in detail. This phase lag causes the vehicular steering characteristic to be subject to understeering, in a range A indicated by diagonal lines in FIG. 10(a) wherein the lateral acceleration detected by the lateral acceleration sensor 26 is great and the load distribution between the front wheels and the rear wheels affects the vehicular steering characteristic, since the load distribution ratio to the rear wheels is decreased as shown in FIG. 10(b).

Figure 11A:
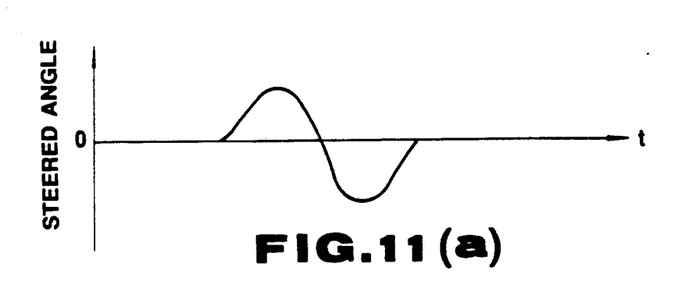
FIGS. 11(a) and 11(b) are graphs which respectively show relations between a lateral acceleration value and time and between a yaw rate and time in a transient state.
Figure 11B:
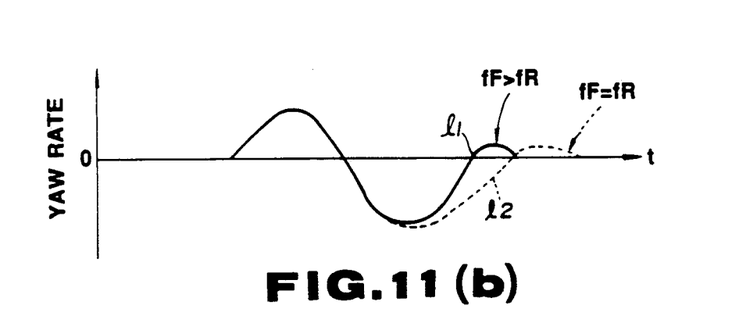
Figure 12:
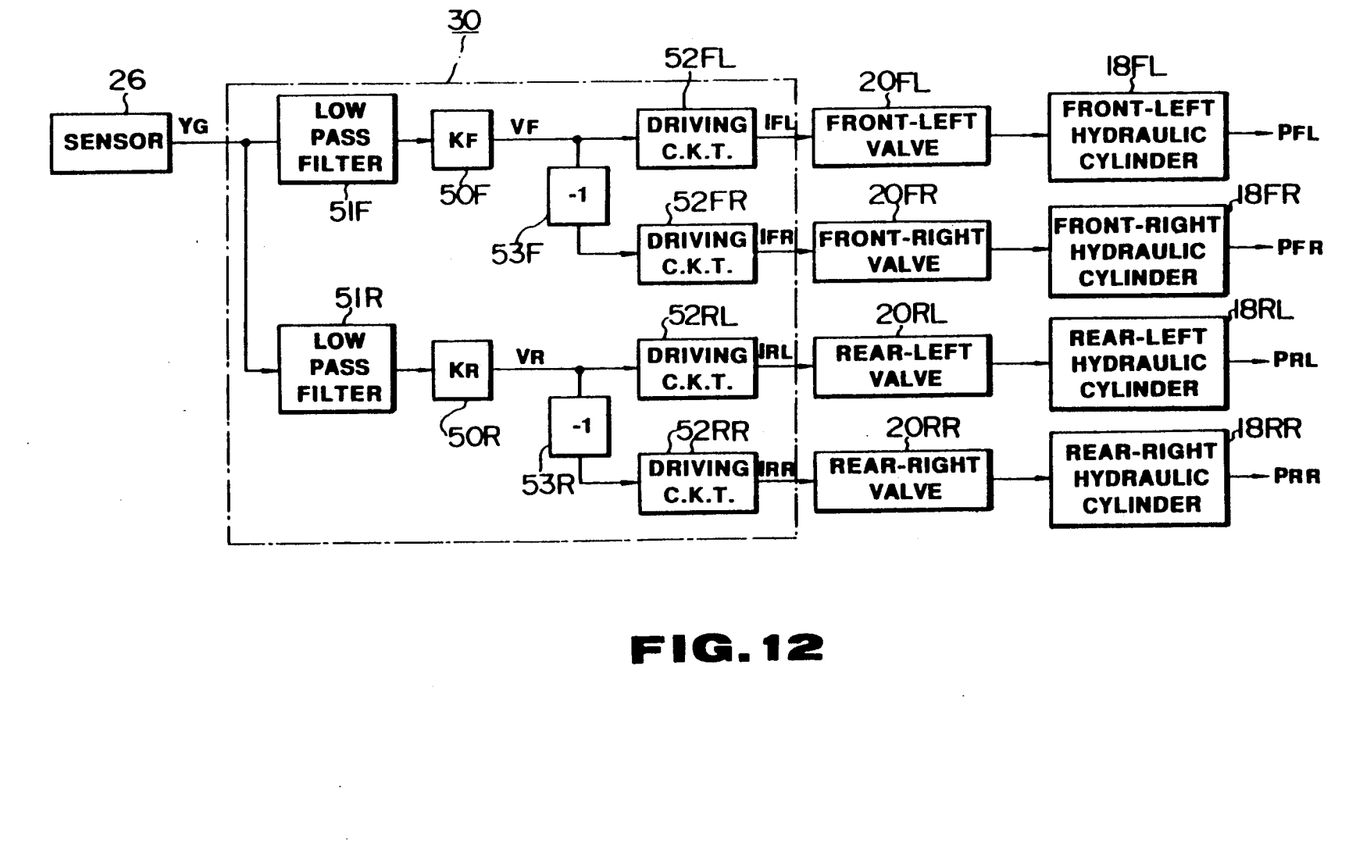
FIG. 12 is a block diagram which shows a modification of the first embodiment.

It will be appreciated that during load distribution control, a cutoff frequency of the rear-wheel control system lower than that of the front-wheel control system causes the response gain of $K'_R$ in the rear-wheel control system when the frequency of the lateral acceleration signal $Y_G$ is in a transient status to become smaller than the response gain $K_F$ of the front-wheel control system, thereby reducing the load distribution to the rear wheels to enhance traction of the rear wheels with improved cornering stability. For example, variation of a yaw rate when steering is made to change a lane at high speed with a steered angle of the front wheels representing a sine curve as shown in FIG. 11(A) converges faster, as indicated by $l_1$ shown in FIG. 12(b), than convergence of a yaw rate, as indicated by $l_2$, when the cutoff frequencies $f_F$ and $f_R$ of the front-wheel and rear-wheel control systems are the same. This results in improved cornering stability.

In the above embodiment, while the low-pass filter 51 is provided with the analog filter, it is not limited to such a filter. A digital low-pass filter is applicable which is represented by the following linear function.

$$Y = \frac{1}{(2T/\tau) + 1}(X + XZ^{-1}) + \frac{(2T/\tau) - 1}{(2T/\tau) + 1} YZ^{-1} \quad (1)$$

where Y denotes an output of the filter, X denotes an input of the filter, $YZ^{-1}$ denotes an output of the filter one sampling cycle before, $XZ^{-1}$ denotes an input of the filter one sampling cycle before, T denotes a sampling time, and T denotes a time constant ($=\frac{1}{2}\pi f$, f denoting a cutoff frequency). Alternatively, a low-pass filter may be provided which represents by a higher degree function more than equal to a quadratic function.

As shown in FIG. 12, in addition to the low-pass filter 51 the same low-pass filter 51F is provided in the front-wheel control system which has a cutoff frequency $f_F$ greater than the cutoff frequency $f_R$ of the low-pass filter 51.

Figure 13:
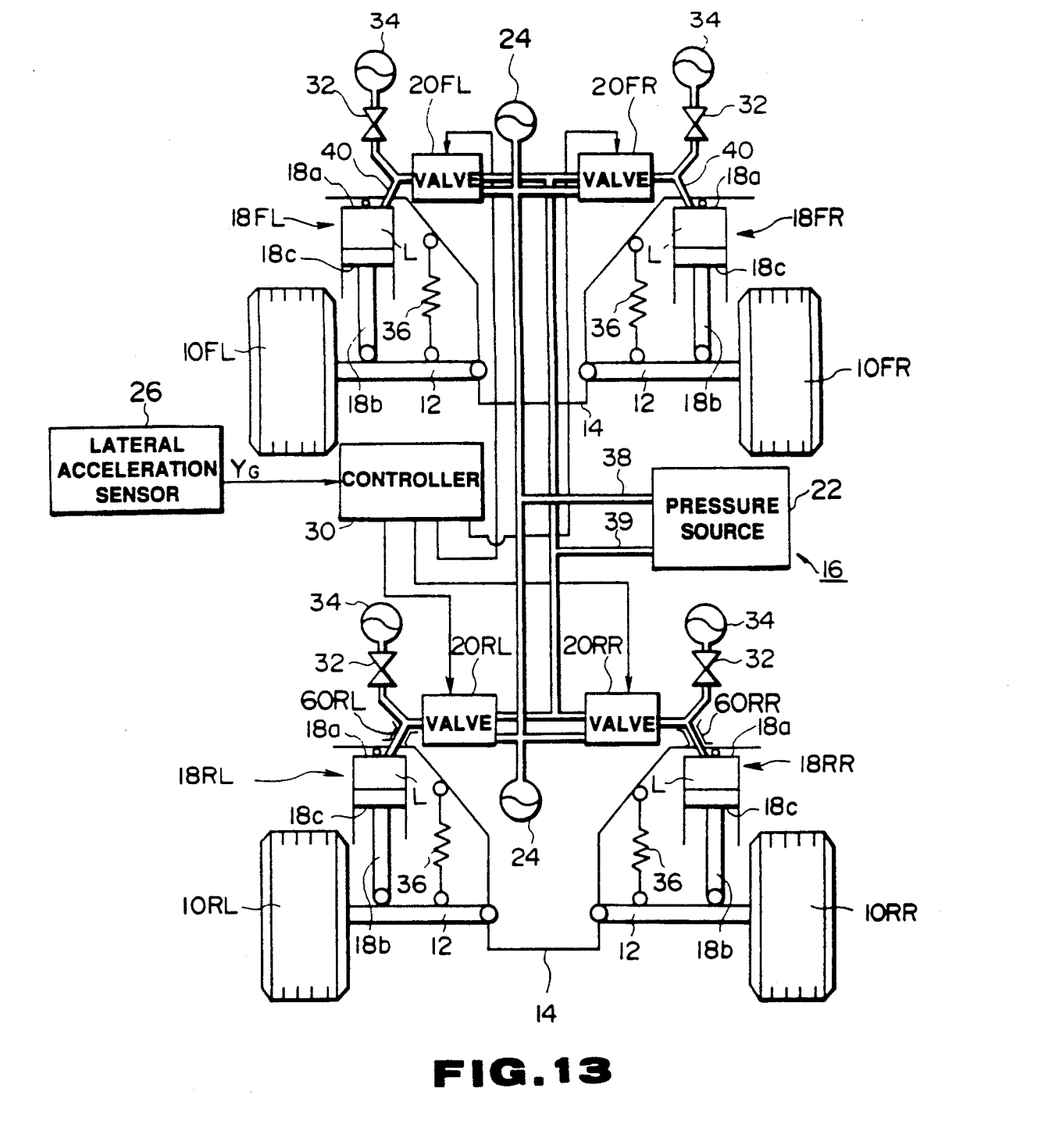
FIG. 13 is a schematic view which shows another modification of the first embodiment.

Further, in place of the low-pass filter for adjusting the transient response gain, a mechanical low-pass filter may be, as shown in FIG. 13, provided which includes throttle valves 60RL and 60RR interposed between the pressure control valves 20RL and 20RR and the hydraulic cylinders 18RL and 18RR for the rear wheels.

Figure 14:
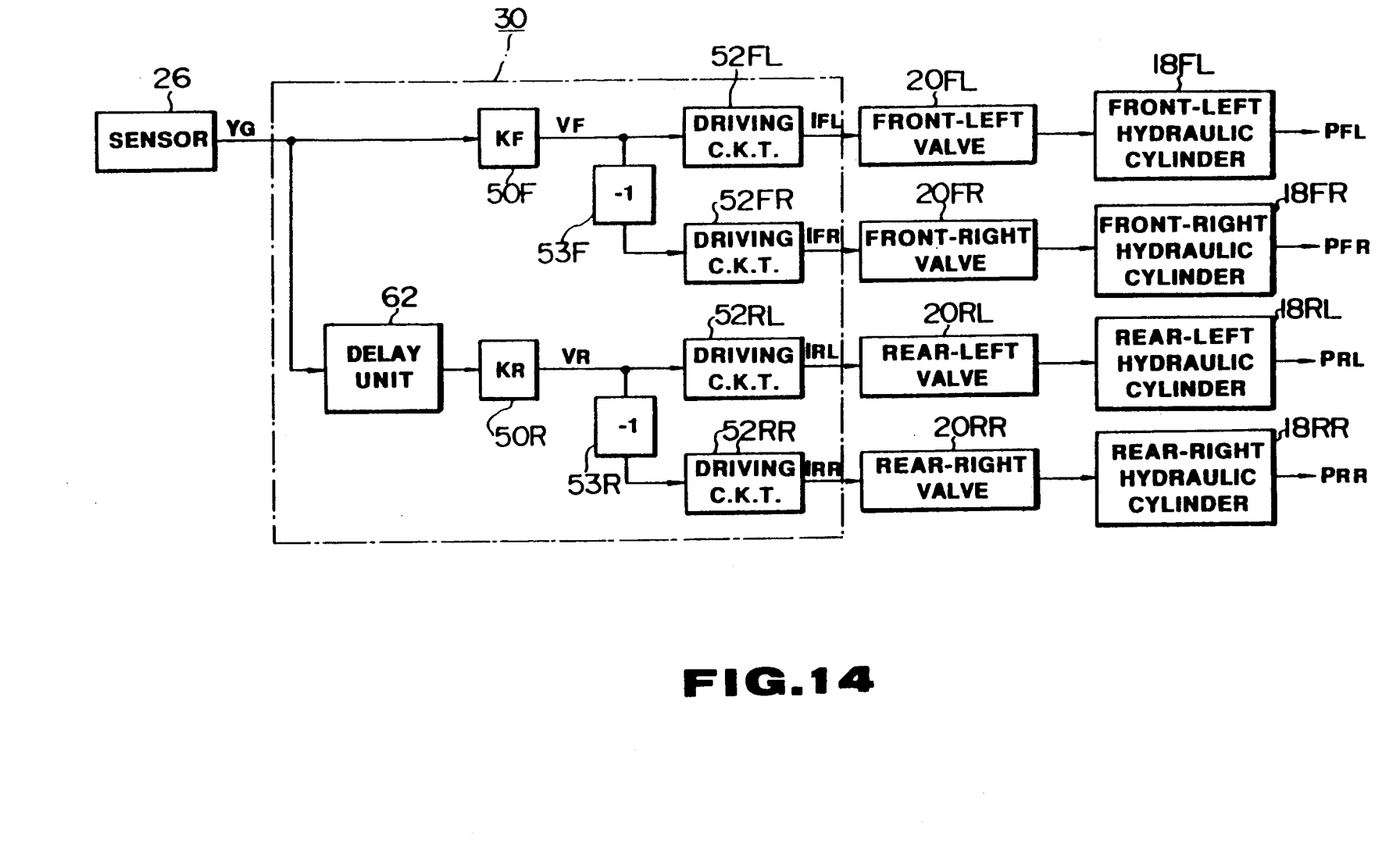
FIG. 14 is a block diagram which shows a control unit according to a second embodiment of the invention.

Referring to FIG. 14, an alternate embodiment is shown which includes a phase delay unit 62 (or a dead time element) operable to delay a phase of the rear-wheel control system relative to that of the front-wheel control system substituting for adjustment of the transient response gains of the front-wheel and rear-wheel control systems by means of the low-pass filter 51. Other components are the same those of the first embodiment and are represented by the same reference numbers and will not described here again.

Figure 15:
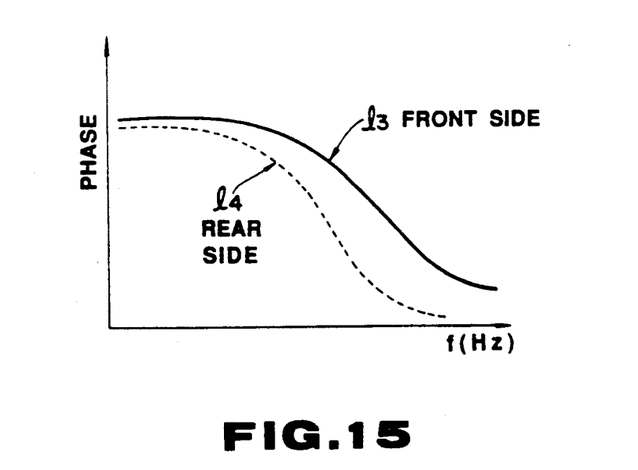
FIG. 15 is a graph which shows a relation between frequency and phase in front-wheel and rear-wheel control systems of the second embodiment.

In this embodiment, even if response gains of front-wheel and rear-wheel control systems are the same, an output Y(n) of the delay unit 62, interposed between a lateral acceleration sensor 26 and a rear-wheel gain controller 50R, which is represented by $e^{-SL}$ (s denoting a Laplace's operator, $L = k\tau$, $k = 1, 2, 3, \ldots, \tau$ denoting a sampling time) is given by a relation of $Y(n) = X(n-k)$. As a result, for a phase characteristic of a lateral acceleration signal $Y_G$ with respect to a frequency, as shown in FIG. 15, a phase of the rear-wheel control system indicated by a broken curve $l_4$ is later than that of the front-wheel control system indicated by a solid curve $l_3$.

Therefore, a phase difference between the front-wheel and rear-wheel control systems is little in steady circle turning wherein a frequency of the lateral acceleration signal $Y_G$ detected by the acceleration sensor 26 is low and thus a vehicle behaves with a preselected steering characteristic. However, in the transient turning wherein the frequency of the lateral acceleration signal $Y_G$ becomes high, the phase difference between the lateral acceleration signals $Y_G$ passing through the delay unit 62 becomes great. It will be noted that as described in the first embodiment with reference to FIG. 10, load distribution to the front wheels occurs later than load distribution to the rear wheels, thereby varying a load distribution ratio, reducing load to the rear wheels with the result that the vehicular steering characteristic is subject to the understeering to improve convergence of a yaw rate.

Figure 16:
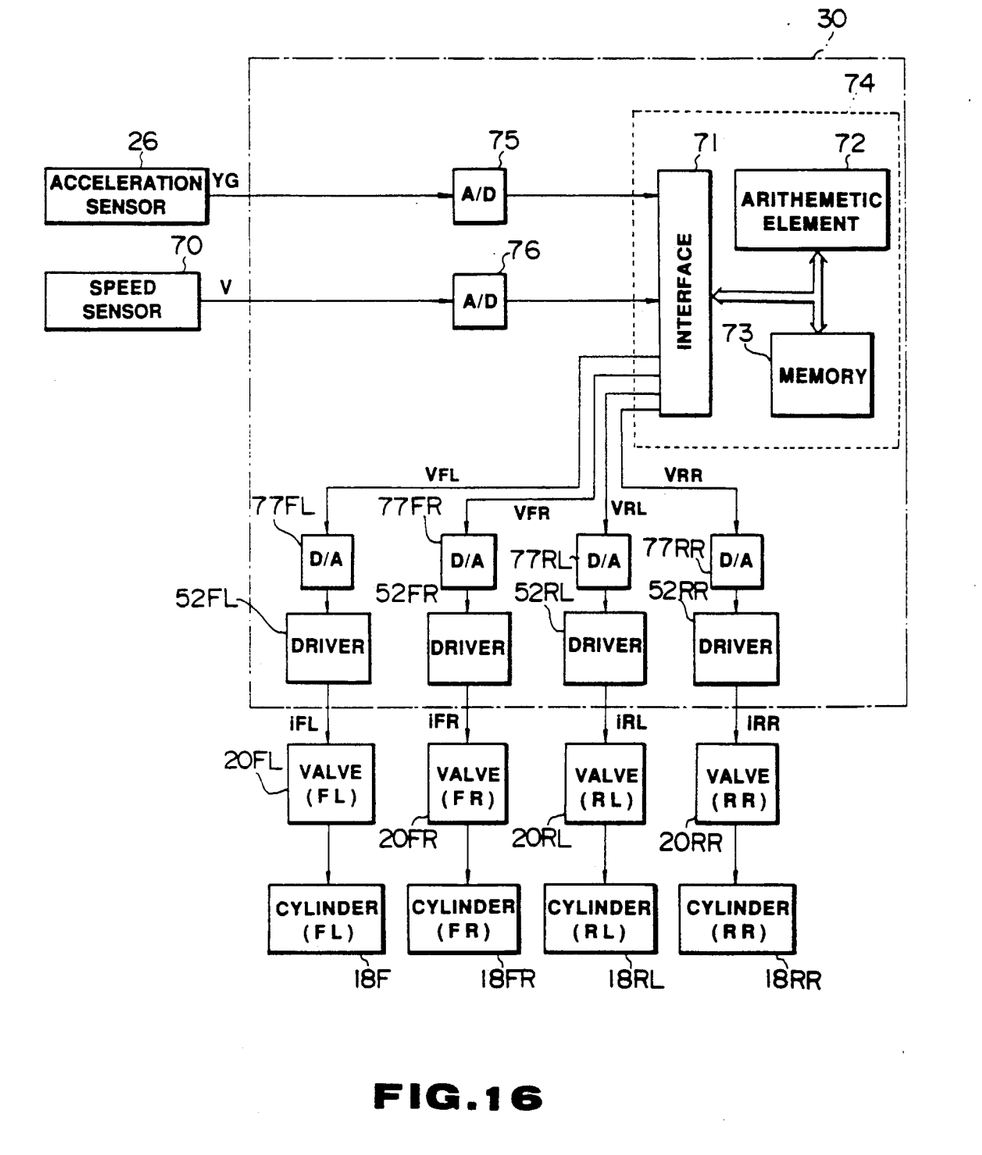
FIG. 16 is a block diagram which shows a control unit of a third embodiment.

Referring to FIG. 16, a third embodiment is shown which is adapted for increasing a difference in cutoff frequencies between front-wheel and rear-wheel control systems according to increase in a vehicle speed.

Figure 17:
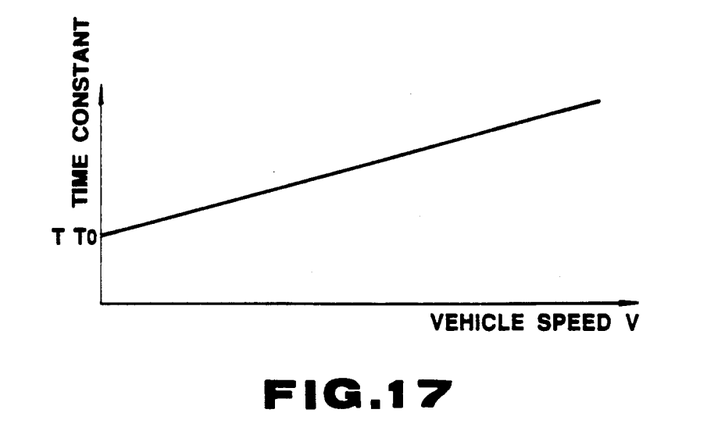
FIG. 17 is a graph which shows a relation between a vehicle speed and a time constant.

This embodiment includes a speed sensor 70 which monitors a vehicle speed. A control unit 30 includes generally a micro-computer 74, an analog-digital converters (A/D converters) 75 and 76, digital-analog converters (D/A converters) 77FL to 77RR, and dirving circuits 52FL to 52RR. The micro-computer 74 includes an interface circuit 71, an arithmetic element 72, and a memory 73. The A/D converter 75 converts a lateral acceleration value $Y_G$ detected by a lateral acceleration sensor 26 into a digital signal. The A/D converter 76 converts a vehicle speed V detected by the vehicle speed sensor 70 into a digital signal. The D/A converters 77FL to 77RR convert pressure command values $V_{FL}$ to $V_{RR}$ output from the interface circuit 71 into analog voltages separately. The driving circuits 52FL to 52RR then convert these analog voltages of the D/A converters 77FL to 77RR into command currents. The memory 73 pre-memorizes a table, as shown in FIG. 17, provided with a characteristic line representative of a relation between the vehicle speed V detected by the speed sensor 70 and a time constant T for determining a cutoff frequency $f_R$ of the low-pass filter. This table shows that when the vehicle speed V is zero, the time constant T is set to a $T_O$ which provides the cutoff frequency $f_R$ substantially equal to the cutoff frequency $f_F$ in the front-wheel control system and is then increased at a preselected ratio according to increase in the vehicle speed V.

The arithemetic element 72 effects logical steps, as will be described hereinafter in detail, every sampling time T as timer interrupt handling.

Figure 18:
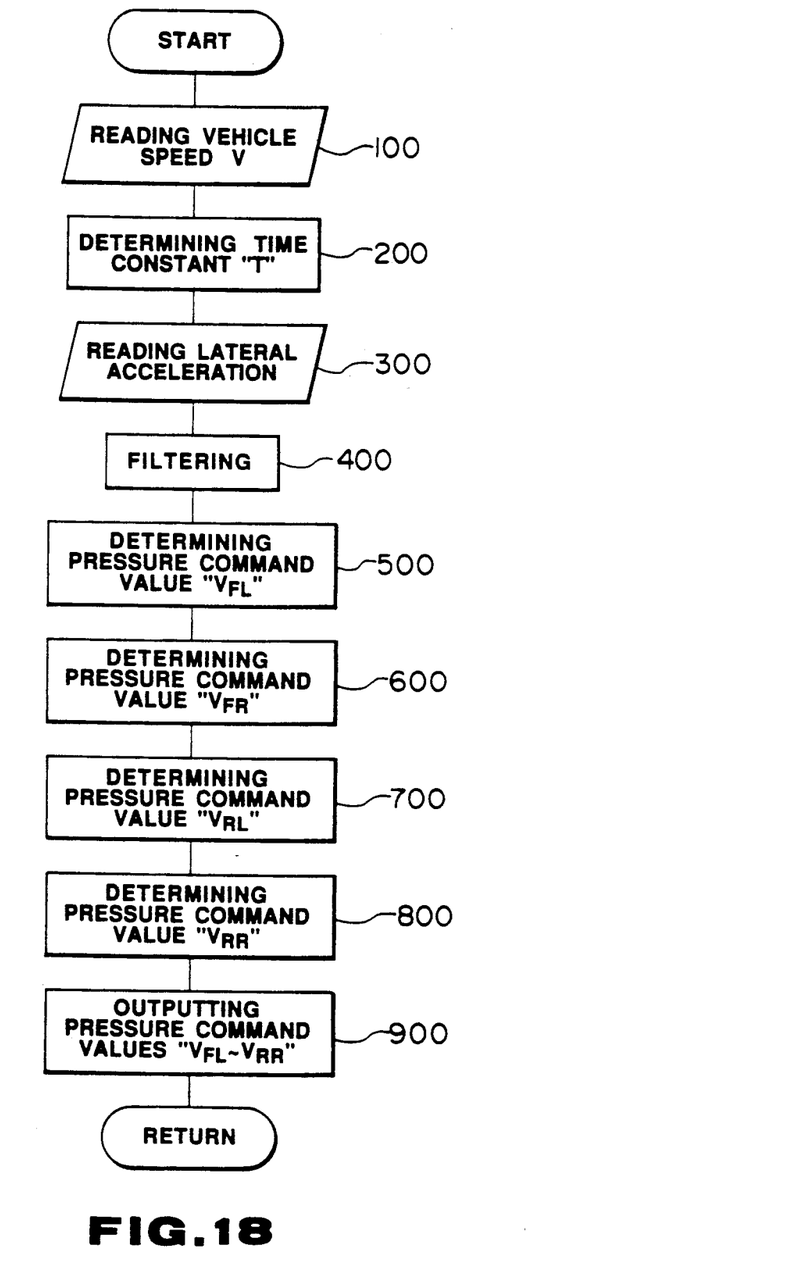
FIG. 18 is a flowchart which shows logical steps performed by a control unit of a third embodiment.

Referring to FIG. 18, there is shown a flowchart of a program or sequence of the logical steps performed by the arithemetic element 72.

After timer interruption, the routine proceeds to step 100 wherein the arithmetic element 72 reads the vehicle speed value. The routine then proceeds to step 200 wherein the time constant T in filtering by the low-pass filter, as will be described hereinafter, is determined based on the vehicle speed V with reference to the table as shown in FIG. 12. Subsequently, the routine proceeds to step 300 wherein the lateral acceleration signal $Y_{G(i)}$ is read and then proceeds to step 400. In step 400, the filtering by the low-pass filter is made to provide a filter output Y which is represented by substituting the time constant T calculated in step 300, a filter output $YZ^{-1}$ one cycle before, and a filter input $XZ^{-1}(=Y_{G(i-1)})$ one cycle before, a current filter input $XZ$ ($=Y_{G(i)}$ for the equation (1).

Thereafter, the routine proceeds to step 500 wherein the lateral acceleration signal $Y_{G(i)}$ is multiplied by the front-wheel load displacement gain $K_{YF}$ to calculate left front-wheel pressure command value $V_{FL}$ and this value is then updated in a storage area for the left front-wheel pressure command value of the memory 73. The routine then proceeds to step 600 wherein the right front wheel pressure command value $-V_{FR}$ is determined by multiplying the left front-wheel pressure command value $V_{FL}$ by "$-1$" and this value is then updated in a storage area for the right front-wheel pressure command value of the memory 73. The routine then proceeds to step 800 wherein the right rear-wheel pressure command value $-V_{RR}$ is determined by multiplying the left rear-wheel pressure command value $V_{RL}$ by "$-1$" and this value is then updated in a storage area for the right rear-wheel pressure command value of the memory 73. The routine then proceeds to step 900 wherein the pressure command values $V_{FL}$ to $V_{RR}$ stored in the memory 73 are read out to be output to the driving circuits 52FL to 52RR through the D/A converters 75FL to 75RR and the timer interruption terminates to return to a main program.

Therefore, due to increase in the time constant T of the digital low-pass filter dependent upon increase in the vehicle speed V, the cutoff frequency $f_R$ of the low-pass filter in the rear-wheel control system gradually becomes smaller than the cutoff frequency $f_F$ in the front-wheel control system. As a result, the degree of load shift between the rear wheels gradually becomes smaller than that between the front wheels according to the increase in the vehicle speed V, thereby enhancing turning properties wherein a steering characteristic at low speed is directed to oversteering. As the vehicle speed becomes higher, the steering characteristic is changed in the favor of understeering resulting in further improved running stability in the lateral acceleration transient status at high speed.

Figure 19:
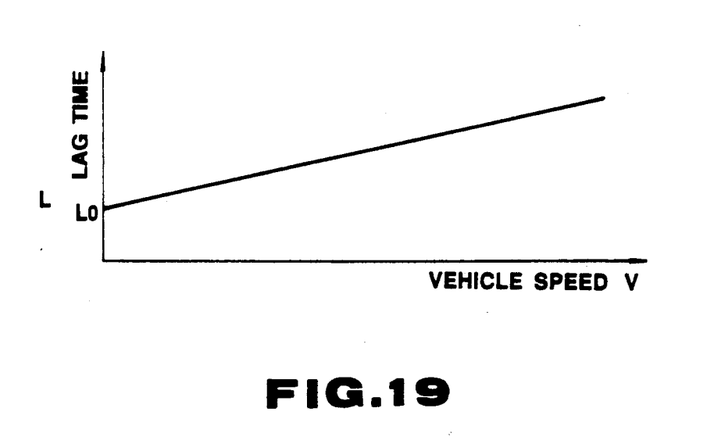
FIG. 19 is a graph which shows a relation between a vehicle speed value and a delay time.

While in the third embodiment, the transient response gain described in the first embodiment is changed according to the vehicle speed, a table, as shown in FIG. 19, providing a relation between the vehicle speed V and the phase delay L may be pre-stored in the memory in place of the table as shown in FIG. 17 to increase the phase delay according to increase in the vehicle speed V, delaying the phase of the rear-wheel control system relative to the front-wheel control system.

Additionally, instead of provision of the tables as shown in FIGS. 17 and 19 in the memory 70, equations indicative of the characteristics of FIGS. 17 and 19 may be memorized to determine the time constant T or the phase delay L by substituting the vehicle speed V for the equations.

Further, increase by stages in the time constant T or the phase delay L according to the vehicle speed may be applicable in place of continuous increase in them. The resistance R and the capacitance C of the analog filter 51 as shown in FIG. 5 may be variable elements to mechanically change them according to the vehicle speed.

While the above embodiments are directed to control anti-rolling only, they are applicable to a control system which is operable to perform a combination of anti-pitching and anti-bouncing control accordingly.

Further, a fluidly operated cylinder other than the hydraulic cylinder such as a pneumatic cylinder may be applicable to the suspension system of the invention.

As mentioned previously, with the active suspension system according to the present invention, when a vehicle is in a steady circle turning, a vehicular steering characteristic is not subject to understeering without varying a stability factor to establish appropriate cornering stability. Also, when the vehicle is in a transient turn, a degree of load shift between the rear wheels is reduced relative to that between the front wheels, thereby advancing convergence of a yaw rate to improve the cornering stability.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An active suspension system for an automotive vehicle, comprising:
    suspension assemblies disposed between a vehicle body and suspension members which respectively support wheels rotatably, each of the suspension assemblies including fluid pressure means of adjustable pressure for active suspension control;
    a pressure circuit communicating with the fluid pressure means to supply pressurized fluid thereto;
    an acceleration sensor monitoring a lateral acceleration acting on the vehicle body to provide signals indicative thereof;
    pressure adjusting means responsive to control signals to adjust pressures of the pressurized fluid supplied to the fluid pressure means of said suspension assemblies respectively through said pressure circuit; and
    control means responsive to the signals from said acceleration sensor to provide corresponding control signals to said pressure adjusting means for controlling the pressures of pressurized fluid to the fluid pressure means to vary load distribution between left and right front wheels and between left and right rear wheels by predetermined ratios determined on the basis of the signals from said acceleration sensor, said control means including load distribution adjusting means providing gains for the control signals each variably dependent upon a frequency of the lateral acceleration monitored by said acceleration sensor to vary the ratios of load distribution such that the degree of load shift for the rear wheels is less than that of the front wheels.

2. An active suspension system for an automotive vehicle comprising:
    suspension assemblies disposed between a vehicle body and suspension members which respectively support wheels rotatably, each of the suspension assemblies including fluid pressure means of adjustable pressure;
    a hydraulic pressure circuit communicated with the fluid pressure means to supply pressurized fluid thereto;
    an acceleration sensor monitoring a lateral acceleration acting on the vehicle body to provide a signal indicative thereof;
    pressure control means for controlling the pressure of pressurized fluid to the fluid pressure means to vary load distribution between left and right front wheels and between left and right rear wheels by predetermined ratios based on the signal from said acceleration sensor, said control means including load distribution adjusting means responsive, in a transient state, to the signal indicative of lateral acceleration, to vary the ratios of load distribution such that the degree of load shift for the rear wheels is less than that of the front wheels; and
    a speed sensor which monitors vehicle speed to provide a signal indicative thereof, said load distribution adjusting means reducing the degree of load shift for the rear wheels relative to that of the front wheels in said transient state of lateral acceleration according to increase in vehicle speed.

3. A system as set forth in claim 1, wherein said fluid pressure means includes front and rear hydraulic cylinders associated with the front and rear wheels respectively, said pressure adjusting means including front and rear pressure control valves associated with front and rear hydraulic cylinders, said load distribution adjusting means including first and second gain controllers providing first and second gains for control signals to the front and rear pressure control valves for adjusting pressure of the first and second hydraulic cylinders based on the signal from the acceleration sensor, said load distribution adjusting means varying the second gain so as to be decreased relative to the first gain to reduce the degree of load shift for the rear wheels relative to that of the front wheels dependent upon the frequency of the lateral acceleration monitored by said acceleration sensor.

4. A system as set forth in claim 3, wherein said load distribution adjusting means includes a low-pass filter which restricts a frequency of the signal from the acceleration sensor higher than a preselected cutoff frequency to reduce the second gain relative to the first gain.

5. A active suspension system for an automotive vehicle, comprising:
    suspension assemblies disposed between a vehicle body and suspension members which respectively support wheels rotatably, each of the suspension assemblies including fluid pressure means of adjustable pressure;
    a hydraulic pressure circuit communicated with the fluid pressure means to supply pressurized fluid thereto;
    an acceleration sensor monitoring a lateral acceleration acting on the vehicle body to provide a signal indicative thereof; and
    pressure control means for controlling the pressure of pressurized fluid to the fluid pressure means to vary load distribution between left and right front wheels and between left and right rear wheels by predetermined ratios based on the signal from said acceleration sensor, said control means including load distribution adjusting means responsive, in a transient state, to the signal indicative of lateral acceleration, to vary the ratios of load distribution such that the degree of load shift for the rear wheels is less than that of the front wheels,
    wherein said fluid pressure means includes hydraulic cylinders associated with the front and rear wheels respectively, said pressure control means including first and second gain controllers for adjusting pressure of the hydraulic cylinders associated with the front and rear wheels with first and second gains respectively based on the signal from the acceleration sensor, said load distribution adjusting means varying the second gain so as to be decreased relative to the first gain to reduce the degree of load shift of the rear wheels relative to that of the front wheels in said transient state of lateral acceleration, and wherein said load distribution adjusting means includes phase delay means for delaying a phase of the signal from said acceleration sensor input to the second gain controller relative to that of the signal input to the first gain controller with a preselected lag time to reduce the degree of load shift for the rear wheels relative to that of the front wheels when the lateral acceleration monitored by said acceleration sensor is in the transient state.

6. A system as set forth in claim 5, further comprising a speed sensor which monitors a vehicle speed to provide a signal indicative thereof, said phase delay means increasing a lag time according to increase in the vehicle speed to reduce the degree of load shift for the rear wheels relative to that of the front wheels in the transient state of lateral acceleration according to increase in the vehicle speed.

7. An active suspension system for an automotive vehicle, comprising:
a suspension system disposed between a vehicle body and wheels for regulating relative displacement between the vehicle body and the wheels, said suspension system including hydraulic pressure assemblies associated with front and rear wheels respectively;
a hydraulic pressure circuit having a pressure source to supply pressurized fluid to the hydraulic pressure assemblies respectively;
a lateral acceleration sensor monitoring a lateral acceleration acting on the vehicle body to provide a signal indicative thereof;
pressure control means for controlling the pressure of the pressurized fluid to the hydraulic pressure assemblies independently to shift load distribution between left and right front wheels and between left and right rear wheels by predetermined ratios based on the signal from said acceleration sensor;
load distribution adjusting means responsive to the signal from said lateral acceleration sensor in a transient state thereof so as to reduce the degree of load shift of the rear wheels relative to that of the front wheels, and
a speed sensor which monitors vehicle speed to provide a signal indicative thereof, said load distribution adjusting means reducing the degree of load shift for the rear wheels relative to that of the front wheels in said transient state of lateral acceleration monitored by said lateral acceleration sensor according to increase in vehicle speed.

8. A system as set forth in claim 7, wherein each of the hydraulic pressure assemblies includes a hydraulic cylinder, a pressure control valve, and a driving circuit for the pressure control valve, said pressure control means including first and second gain controllers, the first gain controller responsive to the signal from said lateral acceleration sensor to amplify a level thereof to a first gain and providing it to the driving circuits to vary pressure of the hydraulic cylinders associated with the front wheels, the second gain controller responsive to the signal from said lateral acceleration sensor to amplify the level thereof by a second gain and providing it to the driving circuit to vary pressure of the hydraulic cylinders associated with the rear wheels, said load distribution adjusting means varying the second gain so as to be decreased relative to the first gain to reduce the degree of load shift for the rear wheels relative to that of the front wheels during transient turning.

9. A system as set forth in claim 8, wherein said load distribution adjusting means include a low-pass filter which restricts a frequency of the signal from the acceleration sensor higher than a preselected cutoff frequency to reduce the second gain relative to the first gain.

10. A system as set forth in claim 8, wherein said load distribution adjusting means include phase delay means for delaying a phase of the signal from said acceleration sensor input to the second gain controller relative to that of the signal input to the first gain controller with a preselected lag time to reduce the degree of load shift for the rear wheels relative to that of the front wheels when the lateral acceleration monitored by said acceleration sensor is in a transient state.

11. A system as set forth in claim 10, further comprising a speed sensor which monitors a vehicle speed to provide a signal indicative thereof, said phase delay means increasing a lag time according to increase in vehicle speed to reduce the degree of load shift for the rear wheels relative to that of the front wheels in said transient state of lateral acceleration monitored by said lateral acceleration sensor according to increase in vehicle speed.

12. A system as set forth in claim 1, further comprising a speed sensor which monitors vehicle speed to provide a signal indicative thereof, said load distribution adjusting means reducing the degree of load shift for the rear wheels relative to that of the front wheels in a transient state of lateral acceleration according to increase in vehicle speed.

13. A system as set forth in claim 1, wherein said load distribution adjusting means includes phase delay means for delaying a phase of the signal from said acceleration sensor input to the second gain controller relative to that of the signal input to the first gain controller with a preselected lag time to reduce the second gain relative to the first gain so as to reduce the degree of load shift for the rear wheels relative to that of the front wheels.

14. A system as set forth in claim 12, further comprising a speed sensor which monitors a vehicle speed to provide a signal indicative thereof, said phase delay means increasing a lag time according to increase in the vehicle speed to reduce the degree of load shift for the rear wheels relative to that of the front wheels.

* * * * *